United States Patent
Bowe et al.

(10) Patent No.: US 11,745,551 B2
(45) Date of Patent: Sep. 5, 2023

(54) TOW BAR ASSEMBLY

(71) Applicant: Curt Manufacturing, LLC, Eau Claire, WI (US)

(72) Inventors: Curtis M. Bowe, Chippewa Falls, WI (US); Graham A. Motzing, Eau Claire, WI (US); Wolfe C. Parzyck, Colfax, WI (US)

(73) Assignee: CURT Manufacturing, LLC, Eau Claire, WI (US)

( * ) Notice: Subject to any disclaimer, the term of this patent is extended or adjusted under 35 U.S.C. 154(b) by 93 days.

(21) Appl. No.: 17/204,496

(22) Filed: Mar. 17, 2021

(65) Prior Publication Data

US 2021/0291599 A1 Sep. 23, 2021

Related U.S. Application Data

(60) Provisional application No. 62/990,831, filed on Mar. 17, 2020.

(51) Int. Cl.
*B60D 1/167* (2006.01)
*B60D 1/155* (2006.01)
*B60D 1/54* (2006.01)

(52) U.S. Cl.
CPC ............ *B60D 1/167* (2013.01); *B60D 1/155* (2013.01); *B60D 1/54* (2013.01)

(58) Field of Classification Search
CPC ............................... B60D 1/167; B60D 1/1675
See application file for complete search history.

(56) References Cited

U.S. PATENT DOCUMENTS

| | | | |
|---|---|---|---|
| 5,224,960 A | 7/1993 | Duncan | |
| 5,429,382 A | 7/1995 | Duncan | |
| RE35,482 E * | 3/1997 | Johnson | B60D 1/167 280/491.4 |
| 5,762,167 A | 6/1998 | Hendrix | |
| 5,765,851 A * | 6/1998 | Parent | B60D 1/167 280/491.4 |
| 5,915,715 A | 6/1999 | Ford | |
| 7,125,031 B1 | 10/2006 | Schoonover | |
| 7,445,226 B1 * | 11/2008 | Hahne | B60D 1/167 280/493 |
| 7,461,855 B2 * | 12/2008 | Klar | B60D 1/167 280/479.2 |

(Continued)

*Primary Examiner* — Kevin Hurley
(74) *Attorney, Agent, or Firm* — Shewchuk IP Services, LLC; Jeffrey D. Shewchuk (57) ABSTRACT

A tow bar assembly has a shank portion for attachment to the towing vehicle hitch, a pivot joint on a trailing end of the shank, and two arms extending from the pivot joint for attachment to the towed load. A stowage block on the shank includes two transversely oriented slots, for receiving a tab on the arms and thereby hold the arms in a transverse, horizontal stowage position. The arms each telescope between extended and retracted positions. A latch, having a retention shaft with a handle, automatically engages to lock the arm in the extended position when the trailing end of the arm is pulled to the extended position. The retention shaft has a shape which, depending on its rotational position as controlled by the handle, either allows the telescoping or interferes with the telescoping, locking the arm in the extended position.

20 Claims, 11 Drawing Sheets

(56) References Cited

U.S. PATENT DOCUMENTS

| | | | |
|---|---|---|---|
| 7,959,180 B1* | 6/2011 | Huston | B60D 1/167 |
| | | | 280/491.2 |
| 8,056,919 B1 | 11/2011 | Huston et al. | |
| 8,505,952 B1* | 8/2013 | Choquette | B60D 1/54 |
| | | | 280/491.2 |
| 8,567,807 B2* | 10/2013 | Su | B60D 1/54 |
| | | | 280/491.1 |
| 8,573,629 B1* | 11/2013 | Kraai | B60D 1/1675 |
| | | | 280/491.4 |
| 8,690,181 B1* | 4/2014 | Roeber | B60D 1/145 |
| | | | 280/491.1 |
| 10,946,703 B2* | 3/2021 | Perotti | B60D 1/54 |
| 2006/0249926 A1* | 11/2006 | Smith | B60D 1/54 |
| | | | 280/491.1 |
| 2014/0333046 A1* | 11/2014 | Olsen | B60D 1/1675 |
| | | | 280/477 |
| 2018/0281667 A1* | 10/2018 | Robinson | B60Q 1/50 |
| 2019/0225036 A1* | 7/2019 | Westervelt | B60D 1/1675 |

* cited by examiner

FIG. 18

TOW BAR ASSEMBLY

CROSS-REFERENCE TO RELATED APPLICATION(S)

The present application claims priority from U.S. Provisional Application No. 62/990,831 entitled TOW BAR ASSEMBLY filed Mar. 17, 2020, incorporated herein by reference.

BACKGROUND OF THE INVENTION

The present invention is directed to the field of towing, and particularly to tow bar structures to transmit towing force between a towing vehicle and a towed load. Examples of prior tow bar structures are shown in U.S. Pat. Nos. 5,224,960, 5,429,382, 5,762,167, 5,765,851, 5,915,715, 7,125,031, 8,056,919 and 8,690,181, all incorporated by reference for their general teaching of the problems and various component designs. In the most common form, the front end of the tow bar is a shank inserted into a receiver hitch on the towing vehicle rear, such as into a 2×2 inch (51×51 mm) receiver opening, and the rear end of the tow bar includes two arms ending in tow bar lugs attached to the frame of the towed vehicle, typically around or in front of the front bumper. The tow bar includes a pivot joint between the shank and the two arms to enable towing around corners and over crests and troughs of the road. The tow bar typically has a length of from two to eight feet, leaving a gap between the towing and towed vehicles.

As tow bars tend to be used over a long product life cycle, potentially including outside storage for years or decades, the designs must be robust and minimize problems due to corrosion or wear. The tow bars need to be reliable, as catastrophic accidents could occur should the tow bar fail. Tow bars must also be low in cost. One particular issue with tow bars involves stowage cases when the tow bar shank is in the receiver hitch of the towing vehicle, but no towed vehicle is attached. Many tow bars do not account for such a stowage possibility, and if left attached to the towing vehicle would still extend for two to eight feet behind the receiver hitch, with no mechanism to secure the tow bar arms from being able to pivot from side to side. Because this creates a somewhat dangerous, cantilevered extension of the tow bar arms and unsecured possibility of swinging of the tow bar arms from side to side, such tow bars essentially require removal from the towing vehicle whenever the tow bar is not in use. In some tow bars, the arms are extended in use but are retractable to a shorter configuration when not in use and for stowage. The tow bar should allow the arms to be quickly and easily moved and secured at a position where they extend as little as possible from the towing vehicle, while also allowing the arms to be quickly and easily extended to a locked position for towing use. Better solutions are needed.

BRIEF SUMMARY OF THE INVENTION

The present invention is a tow bar assembly for transmitting a towing force between a towing vehicle and a towed load, which includes one or more structural features that make the tow bar assembly more convenient for stowage. The tow bar assembly has a shank portion for attachment to the towing vehicle hitch, a pivot joint on a trailing end of the shank, and at least one and more preferably two arms extending from the pivot joint for attachment to the towed load. In one aspect, the tow bar assembly has a stowage position, when attached to the hitch, hold the arm(s) in a transversely extending orientation. The arm(s) are held in the stowage position by having a portion of the arm such as a tab extend into a stowage recess on the shank such as in a stowage block, engaging with the shank to help retain the arm in a transversely-directed, generally horizontal stowage position. In another aspect, the arm(s) are extendable and retractable between shortened and lengthened positions. A latch automatically engages to lock the arm in the extended position when the trailing end of the arm is pulled to the extended position, with the preferred latch having a retention shaft with a handle. A first rotational position places a flat or recess on the retention shaft toward a telescoping portion of the arm, allowing the arm to telescope. A second rotational position positions a portion of the retention shaft to interfere with telescoping, locking the arm in the extended position.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

The present invention is a tow bar assembly 10, shown fully assembled in FIGS. 1-7. In the most preferred embodiment, the tow bar assembly 10 is attached to a towing vehicle by having a shank 12 which can be received in a rectangular socket of a receiver tube hitch 14 as known in the art. For instance, the most preferred shank 12 is formed of a 13 inch (330 mm) long tube of about ¼ inch (6 mm) wall thickness carbon steel with a 2×2 inch (51×51 mm) outer profile. Two pairs of hitch pin openings 16 may be formed in the side walls of the shank 12, positioned at 1 and 3 inches (25 and 76 mm) from the leading end of the shank 12, facilitating hitch pin attachment of the shank 12 to the receiver tube 14 as known in the art and somewhat depicted in FIG. 7. A stowage block 18, its use further described with reference to FIGS. 13-18, is affixed on the top surface of the shank 12 such as by welding if also formed of steel.

A pivot joint 20 is attached on the trailing end of the shank 12, supporting at least one arm 22 and more preferably both a driver side arm 22d and a passenger side arm 22p. The preferred pivot joint 20, further described with reference to FIG. 9, allows the arms 22d, 22p to pivot upwardly or downwardly about a first (i.e., pitch) axis 24, to pivot/rotate around a second (i.e., roll) axis 26, and to pivot from side to side about a third (i.e., yaw) axis 28.

Figures 1, 2:
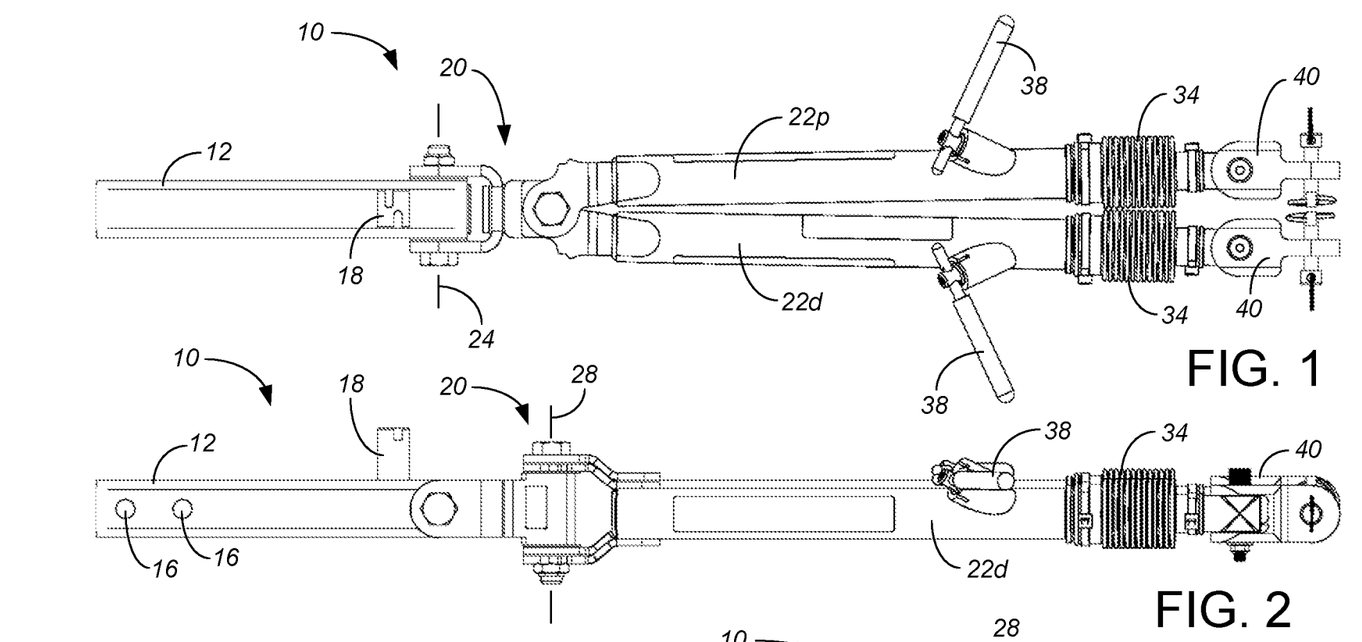
FIG. 1 is a top plan view of a preferred embodiment of a tow bar in accordance with the present invention, with the arms side by side close to one another but in a retracted length.
FIG. 2 is a side view of the tow bar of FIG. 1.
Figure 3:
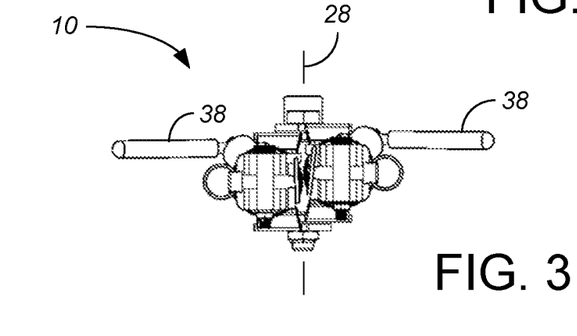
FIG. 3 is a rear end view of the tow bar of FIGS. 1 and 2.
Figure 4:
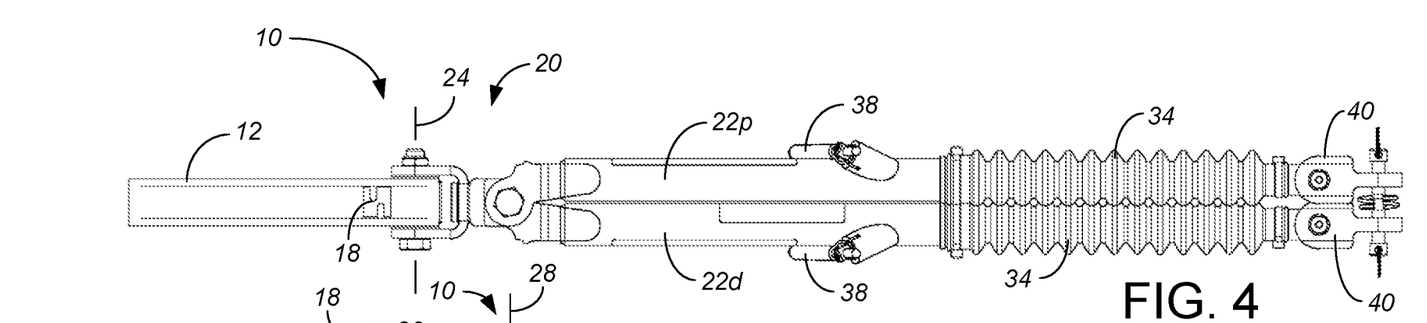
FIG. 4 is a top plan view of the tow bar of FIGS. 1-3 but at a somewhat smaller scale, with the arms side by side close to one another but in an extended length.
Figure 5:
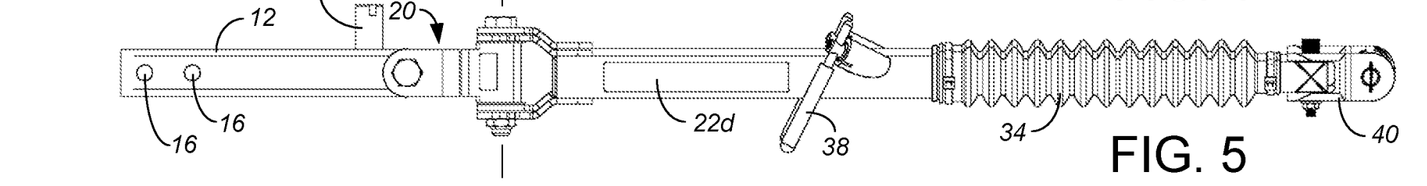
FIG. 5 is a side view of the tow bar of FIG. 4.
Figure 6:
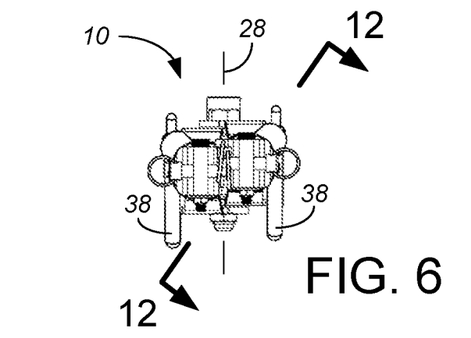
FIG. 6 is a rear end view of the tow bar of FIGS. 4 and 5.
Figure 10:
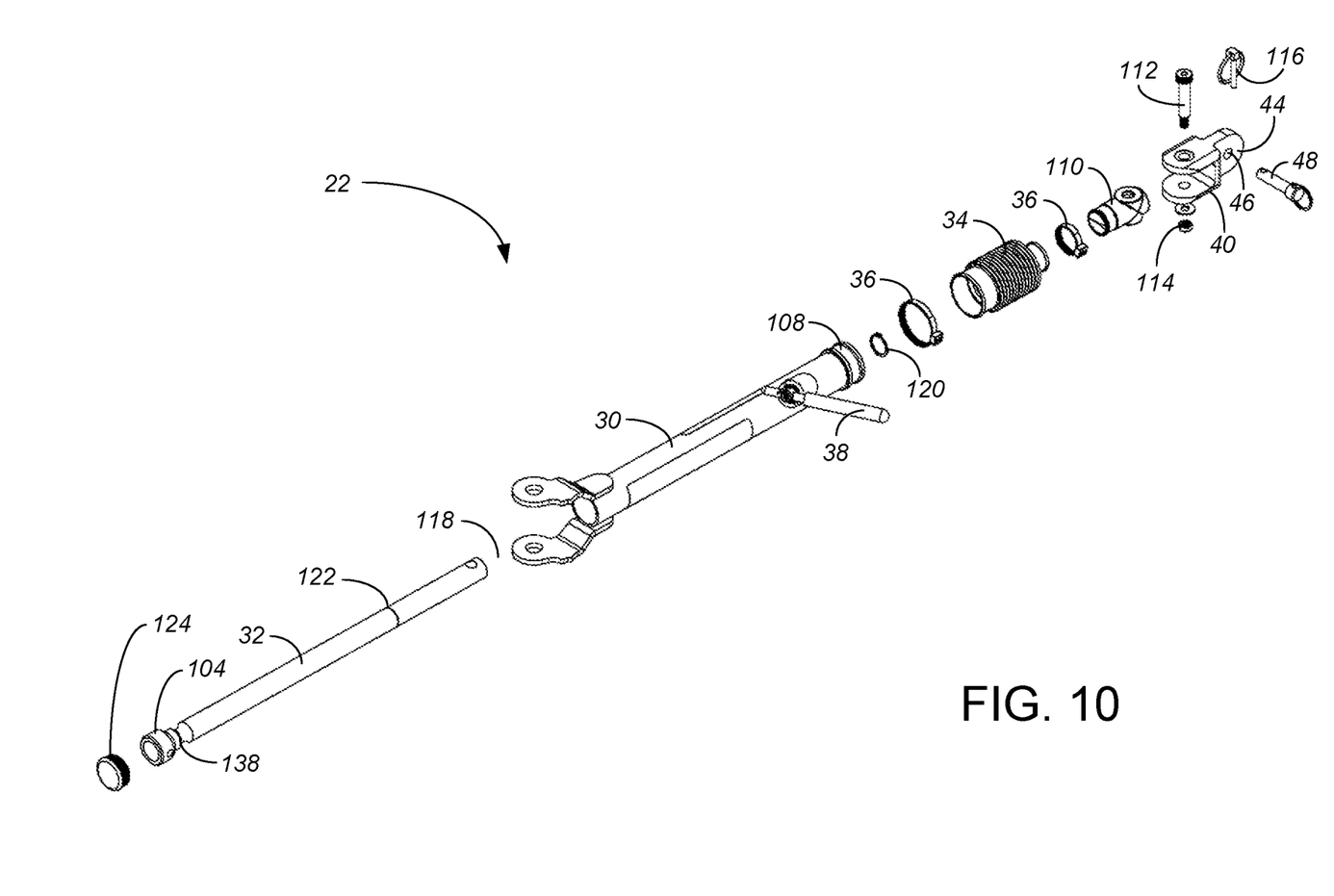
FIG. 10 is an exploded perspective view of a driver side arm assembly used in the tow bar of FIGS. 1-7. The passenger side arm assembly mirrors this driver side arm assembly.

Each of the arms 22d, 22p each are extendable and retractable in their longitudinal direction in a telescoping fashion, such as including a main arm tube 30 around an extension rod 32 as further shown in FIG. 10. A dirt cover, such as a flexible neoprene or rubber bellows 34, is preferably attached such as with cable ties 36 around the sliding connection between the extension rod 32 and the main arm tube 30. Comparison between FIGS. 1 and 2 versus FIGS. 4 and 5 shows the preferred extension and retraction with the differing shape and length of the bellows 34. In the retracted position of FIGS. 1-3, the preferred tow bar assembly 10 has a total length of about 43 inches (1105 mm). In the extended position of FIGS. 4-6, the preferred tow bar assembly 10 has a total length of about 53 inches (1356 mm).

A latch handle 38 on each arm 22 is used to secure that arm 22 in the extended position. FIG. 3 best shows the latch handles 38 extending horizontally in the unlocked position, where the extension rod 32 can be easily pulled out of the main arm tube 30, whereas FIG. 6 best shows the latch handles 38 extending vertically in the locked position, securing the extension rod 32 in a fully extended position out of the main arm tube 30. Typically the unlocked latch handle position, with the extension rod 32 retracted, will be used during stowage and during hook-up, and the locked latch handle position with the extension rod 32 fully extended will be used during towing.

Figure 7:
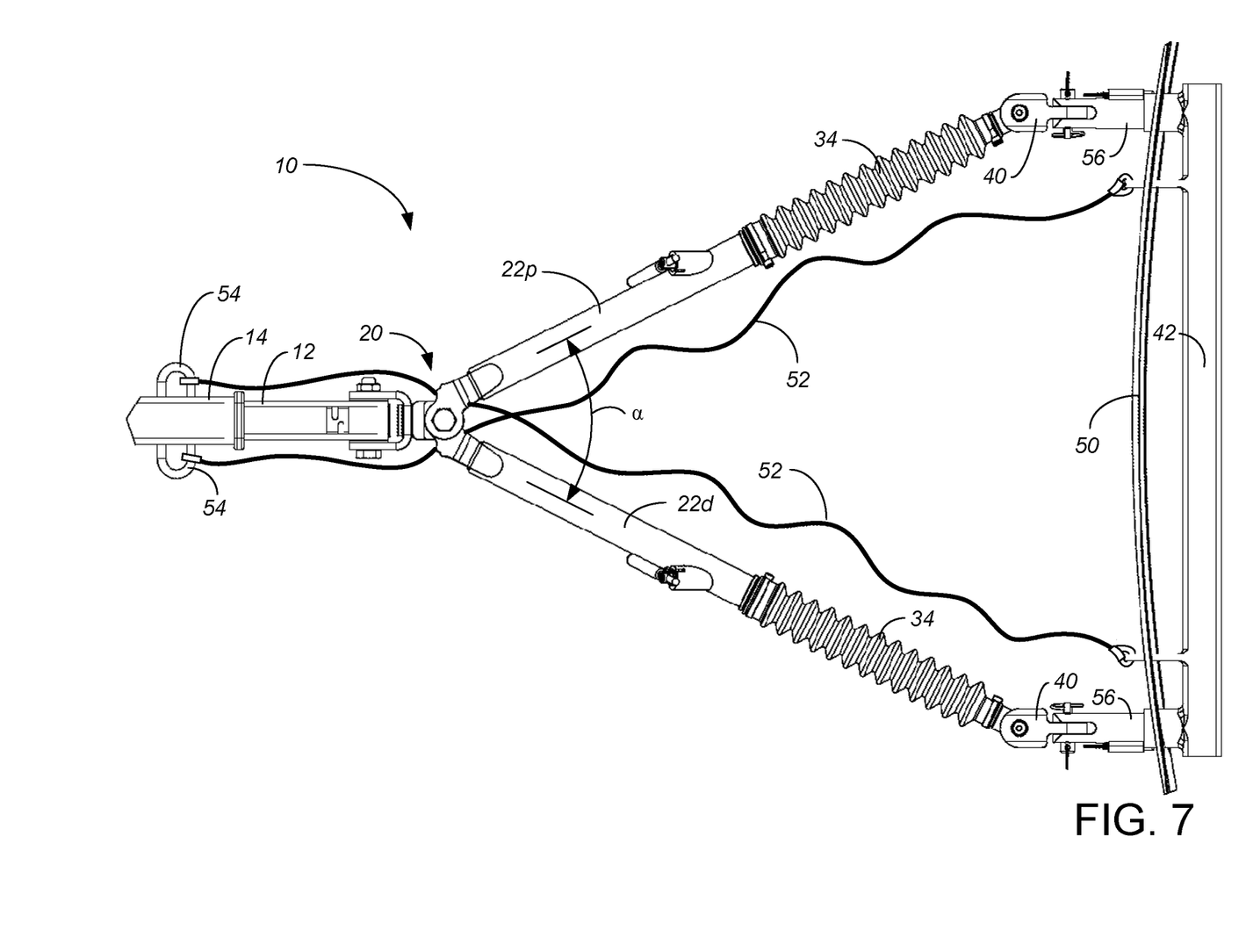
FIG. 7 is a top plan view of the tow bar of FIGS. 1-6 connected between a receiver hitch of a towing vehicle and a towed vehicle.

The trailing end of each arm 22 includes a tow bar lug 40 adapted to attach to the front of a towed load 42. The tow bar assembly 10 is commonly used for towing a smaller automobile behind an RV or truck, in which case the tow bar lugs 40 include a shackle end 44 with a horizontal and transversely oriented hole 46 typically used for attachment with a pin 48 to the automobile just underneath the front bumper 50 as depicted in FIG. 7. Safety cables 52, shown only in FIG. 7, are preferably also attached during towing, such as running from the towing vehicle's safety chain loops 54 to the towed vehicle's base plate tabs 56 in a crossing pattern under the tow bar 10.

Figure 8:
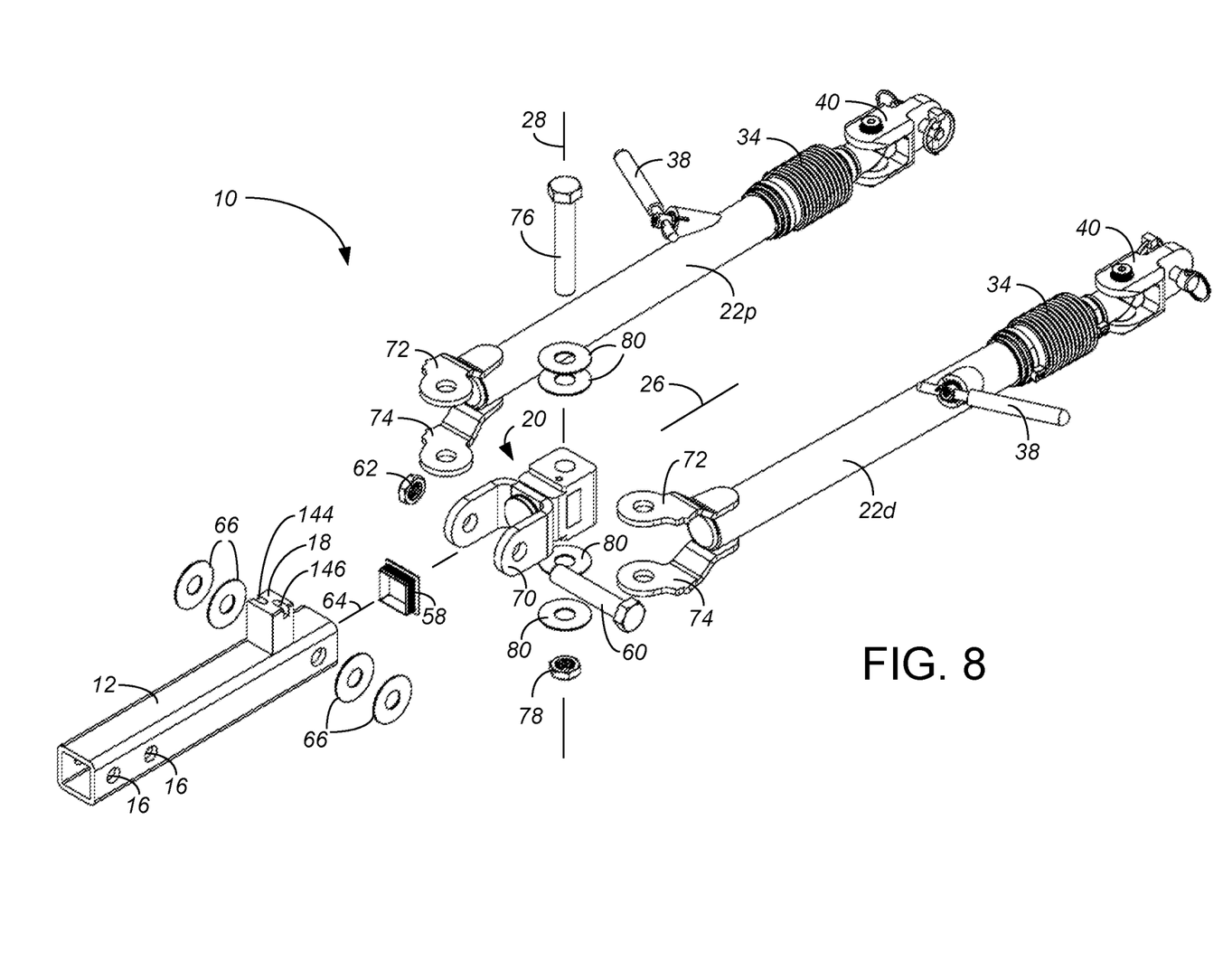
FIG. 8 is an exploded perspective view of the tow bar of FIGS. 1-7.

FIG. 8 shows a first level assembly or exploded view of the tow bar assembly 10. A plug 58, such as formed of polyethylene, can be used to close the trailing end of the shank 12. The shank weldment 12 is preferably attached to the pivot joint 20 using a ¾ inch alloy steel shoulder bolt 60 defining a horizontal, transversely extending first (pitch) pivot axis 24, as well as its associated nut 62. This pivoting motion about the bolt axis 24 allows the towed vehicle to move upwards and downwards relative to horizontal as defined by the longitudinal axis 64 of the shank 12, particularly important such as for pitch differences between the towing vehicle and the towed load 42 when proceeding over the crest of a hill or the trough of a valley in the roadbed. Two pairs of anti-friction washers 66, such as formed of nylon, can be used so as to minimize friction during the upward/downward pivoting motion. The anti-friction washers 66 also help to reduce noise in the tow bar 10 during towing. In the preferred assembly 10, one anti-friction washer 66 is used on each of the inside and outside faces of both ears 68 of a clevis 70 of the pivot joint 20.

The leading end of each arm 22 preferably includes upper and lower support plates 72, 74. The arms 22d, 22p are preferably attached to the pivot joint 20 using a ¾ inch alloy steel shoulder bolt 76 defining a generally vertically extending third pivot axis 28 through the upper and lower support plates 72, 74, as well as its associated nut 78. This side-to-side pivoting motion about bolt 76 and pivot axis 28 allows the initial hook-up attachment at whatever lateral separation width between the two shackles 44 is required by the towed vehicle. In the most preferred embodiment, the arms 22d, 22p each have an extended length of about 36 inches (915 mm), and during towing typically form an angle α within a range of 20-70° between them, i.e., the two shackles 44 are typically deployed with a lateral separation width for attachment to the towed vehicle of 12 to 68 inches (300 to 1730 mm), shown in FIG. 7 at an angle α of about 56° between them with a lateral separation width of about 34 inches (860 mm). The side-to-side pivoting motion also allows for yaw differences between the towing vehicle and the towed load 42 when towing around corners, i.e., when the longitudinal axis 64 of the shank 12 is not parallel to the direction the towed vehicle is facing. Two pairs of anti-friction washers 80, such as formed of nylon, can be used so as to minimize friction during the side-to-side pivoting motion. In the preferred assembly 10, one anti-friction washer 80 is used on each of the top and bottom faces of the pivot joint 20, one anti-friction washer 80 is used between the upper support plates 72, and one anti-friction washer 80 is used between the lower support plates 74. The upper and lower support plates 72, 74 are preferably formed of carbon steel, shaped as mirror images merely to reduce the number of unique parts.

Figure 9:
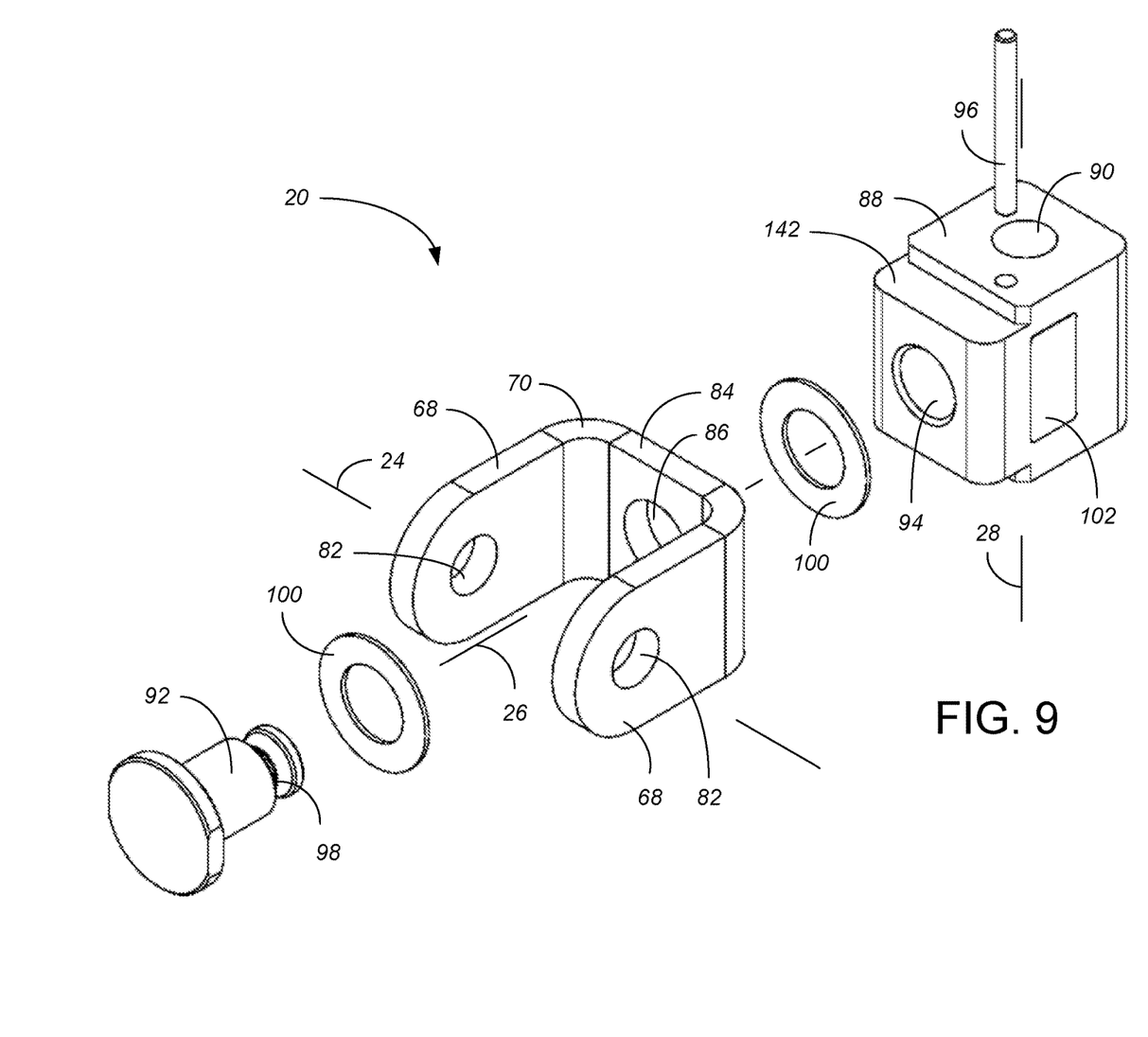
FIG. 9 is an exploded perspective view of a pivot joint used in the tow bar of FIGS. 1-7.

FIG. 9 shows an assembly or exploded view of the preferred pivot joint 20. The clevis 70 used for attachment to the shank weldment 12 includes two ears 68 with holes 82 about the first (pitch) pivot axis 24, and a center portion 84 with a hole 86 about the second (roll) pivot axis 26. The preferred clevis 70 is formed of carbon steel at a thickness of about ¼ inch (25 mm). A pivot block 88 used for attachment to the two arms 22d, 22p includes a hole 90 defining the third (yaw) pivot axis 28. A pivot pin 92 is used to rotationally attach the pivot block 88 to the clevis 70, for pivoting about the second (roll) axis 26. The roll-type pivoting is particularly important when the roadway changes its side-to-side slope or turn bank angle. In the most preferred embodiment, the longitudinal hole 94 in the pivot block 88 is threaded to mate with threads on the outside of the pivot pin 92, and the pivot pin 92 is further positively secured relative to the pivot block 88 by a dowel pin 96 which extends through the pivot block 88 and mates into a circumferential groove 98 of the pivot pin 92. The pivot block 88 can be formed of carbon steel, while the pivot pin 92 and dowel pin 96 can be formed of alloy steel. Two anti-friction washers 100, such as formed of nylon, can be used so as to minimize friction during the rotational (roll) pivoting motion. The preferred embodiment places the anti-friction washers 100 around the center portion 84 of the clevis 70. A serial number label 102 may be included on the side of the pivot block 88.

FIG. 10 shows an assembly or exploded view of the preferred driver side arm 22d. The preferred extension rod 32 is primarily formed from about 1" (25 mm) diameter round alloy steel stock. The extension rod 32 includes a wider end stop portion 104 which mates in a bearing relationship within a bore of the main arm tube 30. The end stop portion 104 may be welded onto the extension rod 32 or more preferably attached to the extension rod 32 with an end stop bolt 106 shown in FIG. 12. The main arm is primarily a cylindrical tube 30 with a preferred internal diameter of about 1.5 inches (38 mm) and a wall thickness of about 0.12 inches (3 mm), but with a bushing end 108 providing a smaller 1 inch diameter (25 mm) diameter bore for the central extension rod shaft 32. The trailing end of the extension rod 32 connects through a boot sleeve 110 to the lug 40 using ½ inch (12 mm) diameter shoulder bolt 112 and nut 114. This shoulder bolt 112 defines a pivoting axis for the lug 40, so the shackle 44 can always be oriented in the longitudinal direction of the towed vehicle during towing. A ½ inch (12 mm) diameter pin 48 can also be provided for attachment to the towed vehicle, including a ¼ inch lynch pin 116. The sliding connection between the extension rod 32 and the cylindrical tube 30, together with torsional flexibility of the bellows 34, allows the lug 40 to be permitted some rotation about the arm axis 118 relative to the tube 30 if necessary for tight attachment of the shackle 44 to the towed vehicle.

A retaining ring 120 may nest into a groove 122 on the extension rod 32 to prevent the extension rod 32 from overly retracting. Similar in construction to plug 58, an end cap 124 may be used on the main arm 30 after assembly of the extension rod 32 therein.

Figure 11:
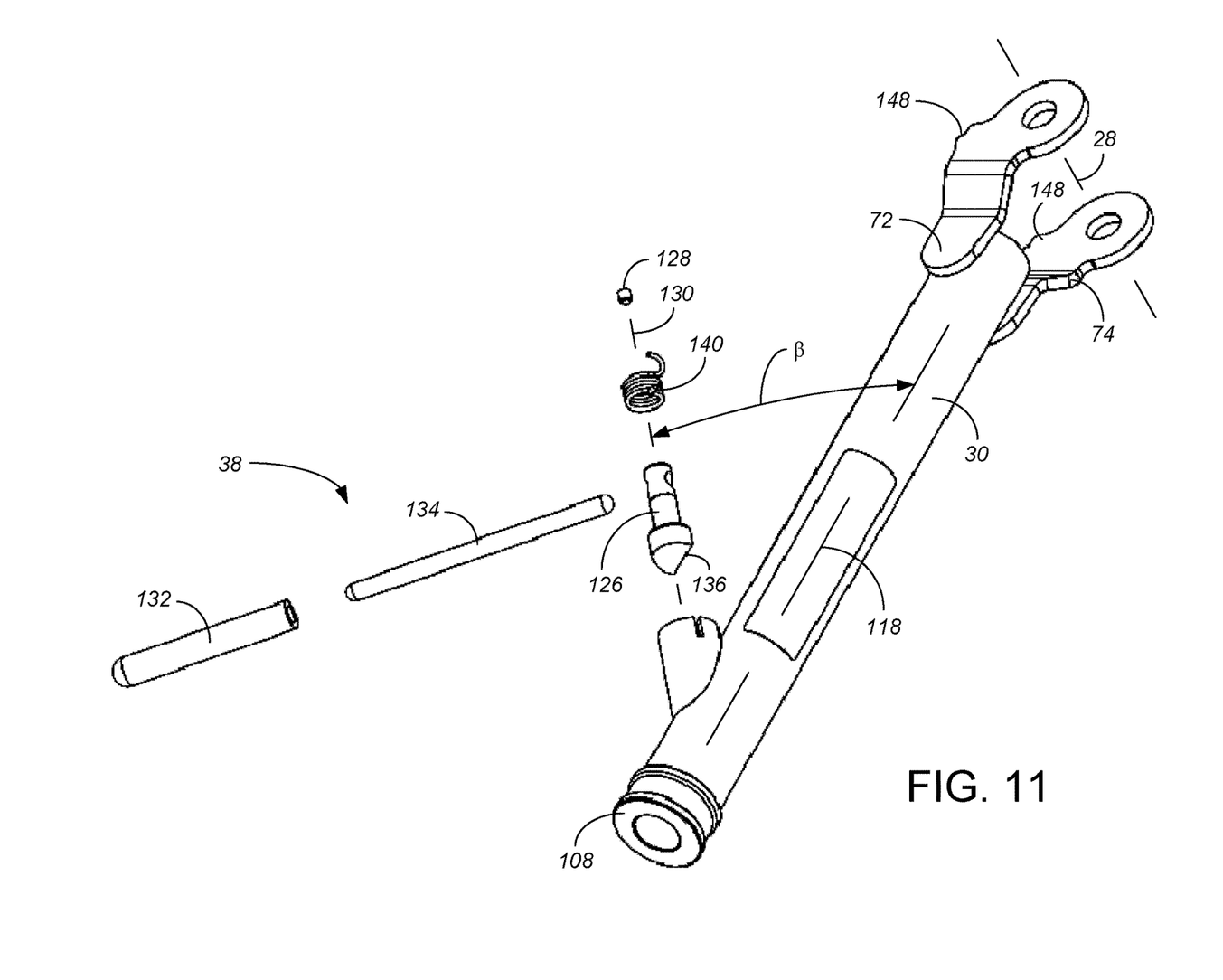
FIG. 11 is an exploded perspective view of a driver side arm tube and latch used in the driver side arm assembly of FIG. 10 and in the tow bar of FIGS. 1-7. The passenger side arm tube and latch mirrors this driver side arm tube and latch.
Figure 12:
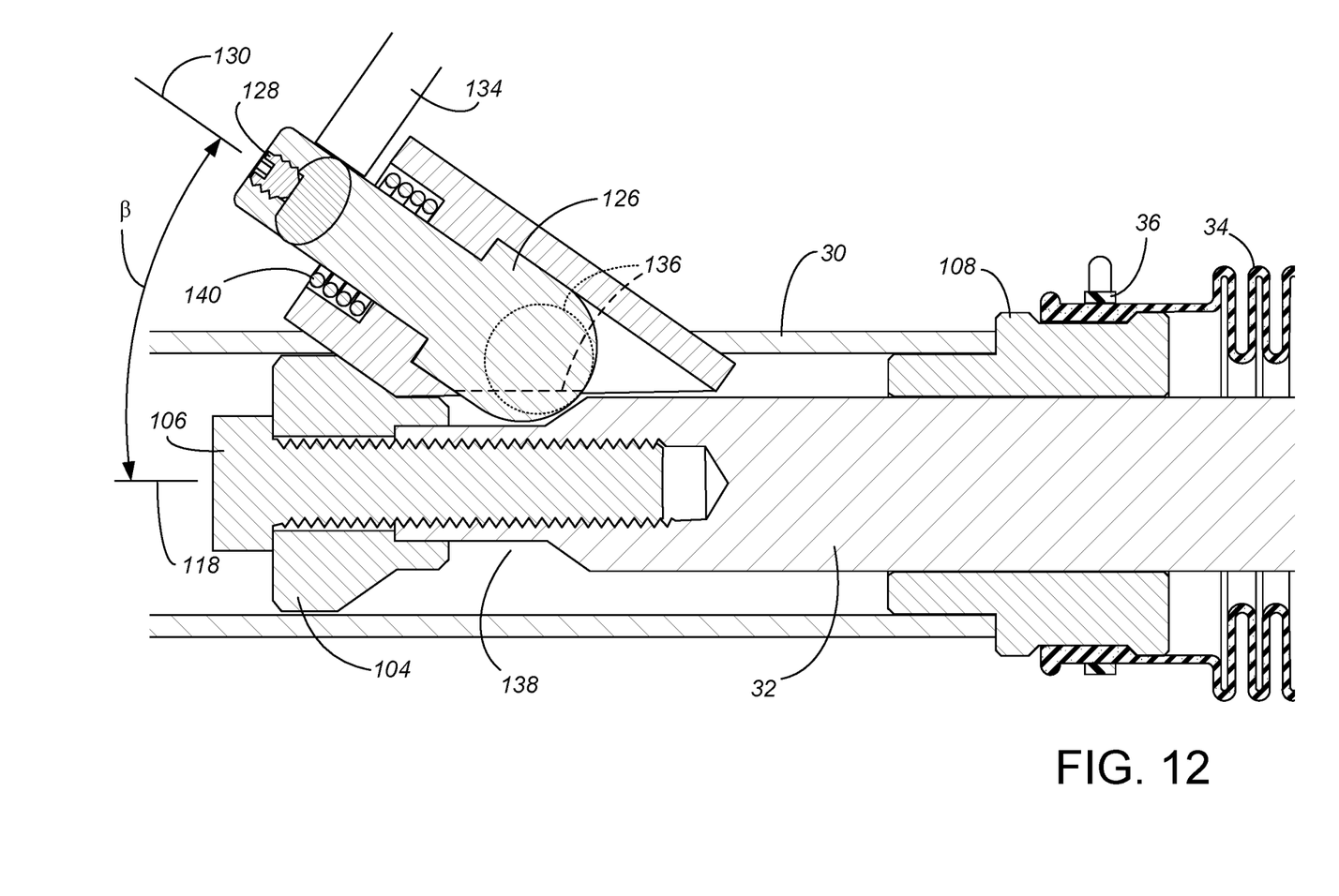
FIG. 12 is a partial cross-sectional view through the arm tube and latch, centered on the axis of the arm tube and the axis of the latch rod stop, with the arm in the fully extended and locked position, taken along cut line 12-12 in FIG. 6.

FIGS. 11 and 12 best show the preferred locking latch mechanism. A retention shaft 126 is fitted into the main arm tube 30 at a non-perpendicular angle β relative to the longitudinal axis 118 of the arm 22 which in the preferred embodiment is about 35°. The handle 38 is secured to the retention shaft 126, such as with a set screw 128, so the retention shaft 126 can be rotated about a retention shaft axis 130. The preferred handle 38 includes a vinyl grip 132 around a steel handle rod 134.

The distal end of the retention shaft 126 includes an angled flat 136 or recess relative to the rest of its shape, such that the retention shaft 126 can have a first (locked) rotational position wherein the distal end extends closer to the longitudinal axis of the extension rod 32 and a second (opened) rotational position wherein the distal end extends further from the longitudinal axis of the extension rod 32. In the first rotational position shown in FIG. 12, the end of the retention shaft 126 can mate into a recess 138 formed on the end of the extension rod 32 next to the end stop 104. At this rotational position, the flat 136 is out of the cross-sectional plane and shown with a dotted line, such that the retention shaft 126 prevents retraction of the extension rod 32 within the main arm tube 30. A torsion spring 140 can be included to help bias the retention shaft 126 toward the locked position. Additionally or alternatively, the orientation of the handle 38 can use a gravitational assist to bias the retention shaft 126 toward the locked position. In the second rotational position, the recess or flat 136 (shown also with a dashed line representing where the flat 136 is after using the handle 134 to rotate the retention shaft 126) or recess is wide enough to allow passage of the central portion of the extension rod 32, thereby allowing telescoping retraction of the extension rod 32 within the main arm tube 30. Lifting the handle 38 upward eliminates contact between the retention shaft 126 and extension rod 32 for free sliding, whereas until the fully extended position is reached, the gravitational weight of the handle 38 and the torsion spring 140 will cause a friction force between the flat 136 and the main section of the extension rod 32 for more controlled extension or retraction. In the preferred embodiment, the distal end of the retention shaft 126 is small enough to permit assembly by insertion through the bearing end 108 prior to attachment of the handle rod 134 to the retention shaft 126.

With this description of the structure of the locking latch mechanism, the preferred procedure for hooking up the tow bar assembly 10 between the towing vehicle and the towed load 42 is as follows. First, with the stowage block 18 pointing upward, the shank 12 is inserted into the receiver hitch tube 14 of the towing vehicle and secured with a hitch pin (not shown). With two pin holes 16 in the shank 12, it is recommended to use the furthest forward position possible. The towed vehicle is positioned on a level surface squarely behind the towing vehicle slightly forward of the towing position gap distance, typically with a gap of two to three feet between the two vehicles. Both vehicles are parked, preferably with a parking brake on. To ensure a good transfer of towing forces between the vehicles, the mounting tabs 56 of the towed vehicle should be vertically within about 3 inches (76 mm) of the longitudinal axis 64 of the shank 12. The arms 22d, 22p are positioned toward the towed load 42 with the latch handles 38 on the tops of the arms 22d, 22p. The user then extends each arm 22 to the towed vehicle tabs 56; lifting the latch handle 38 eases moving the arms 22d, 22p in and out and aids in maneuvering. One arm 22 at a time, the tow bar lug 40 is aligned to the corresponding towed vehicle tab 56 and secured with the pin 48 and lynch pin 116. The user then disengages the parking brake of the towed vehicle and sets the towed vehicle transmission (such as in neutral) for towing, unlocking the towed vehicle steering wheel. The user then drives the towing vehicle slightly forward until one or both of the locking handles 38 are engaged. With either or both of the biasing force of the torsion spring 140 or the gravitational weight of the latch handle 38, the handles 38 automatically engage and snap to a vertical position when locked. If only one locking handle 38 is engaged, the user should turn the towing vehicle steering wheel toward the locked, fully extended tow bar arm while slowly driving forward. The user should always verify that both latch handles 38 are in the locked position prior to towing. The user then attaches the safety cables 52 to the towing vehicle's safety chain loops 54, crossed underneath the tow bar 10, and to the towed vehicle base plate tabs 56. Care should be taken that the safety cables 52 do not come into contact with the ground, the tow bar arms 22d, 22p or the latch handles 38. Electrical cables (not shown) may also be attached between the towing and towed vehicles.

Figure 13:
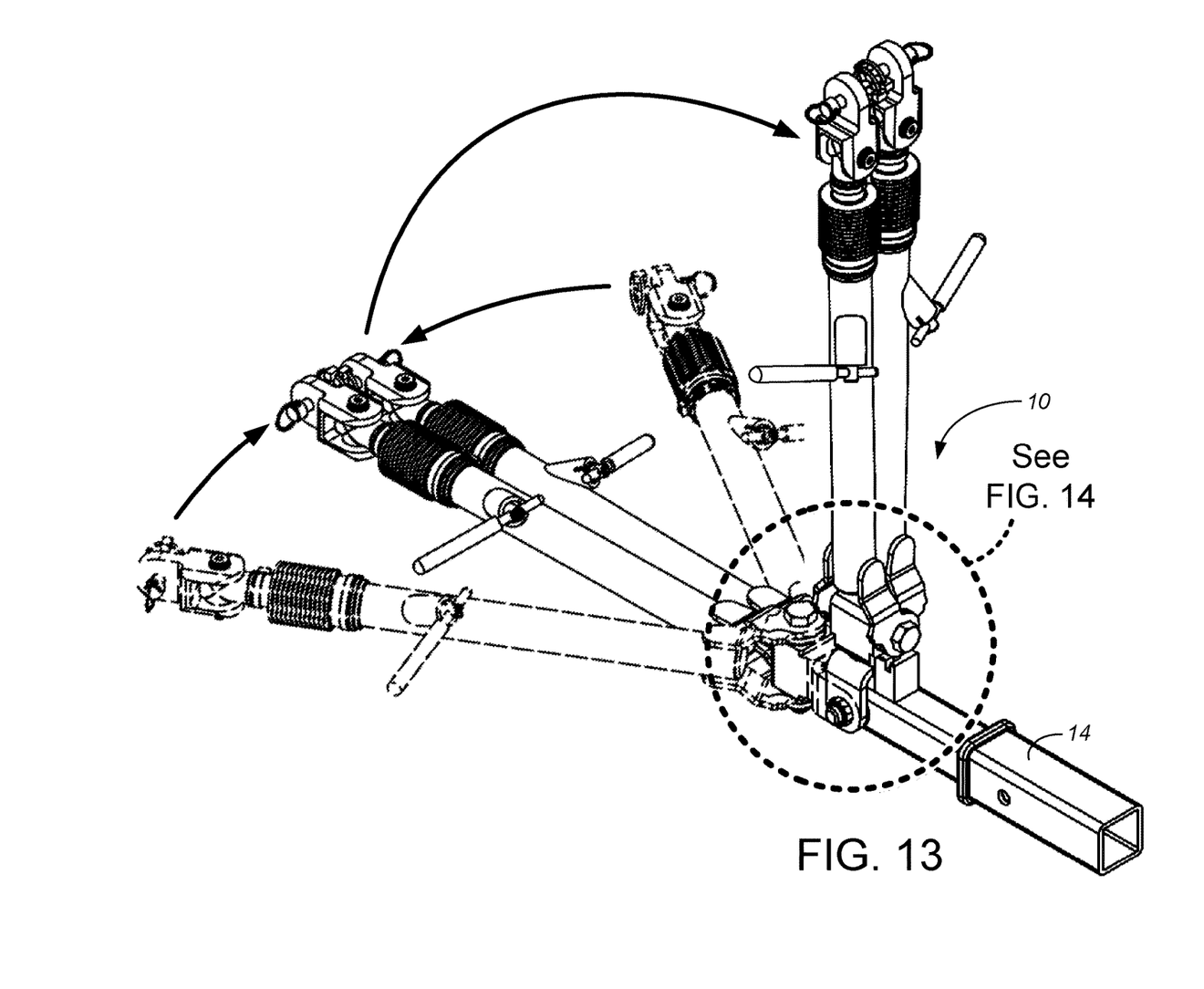
FIG. 13 is a perspective view of the tow bar of FIGS. 1-7, showing the first two stowage steps.
Figures 14, 16:
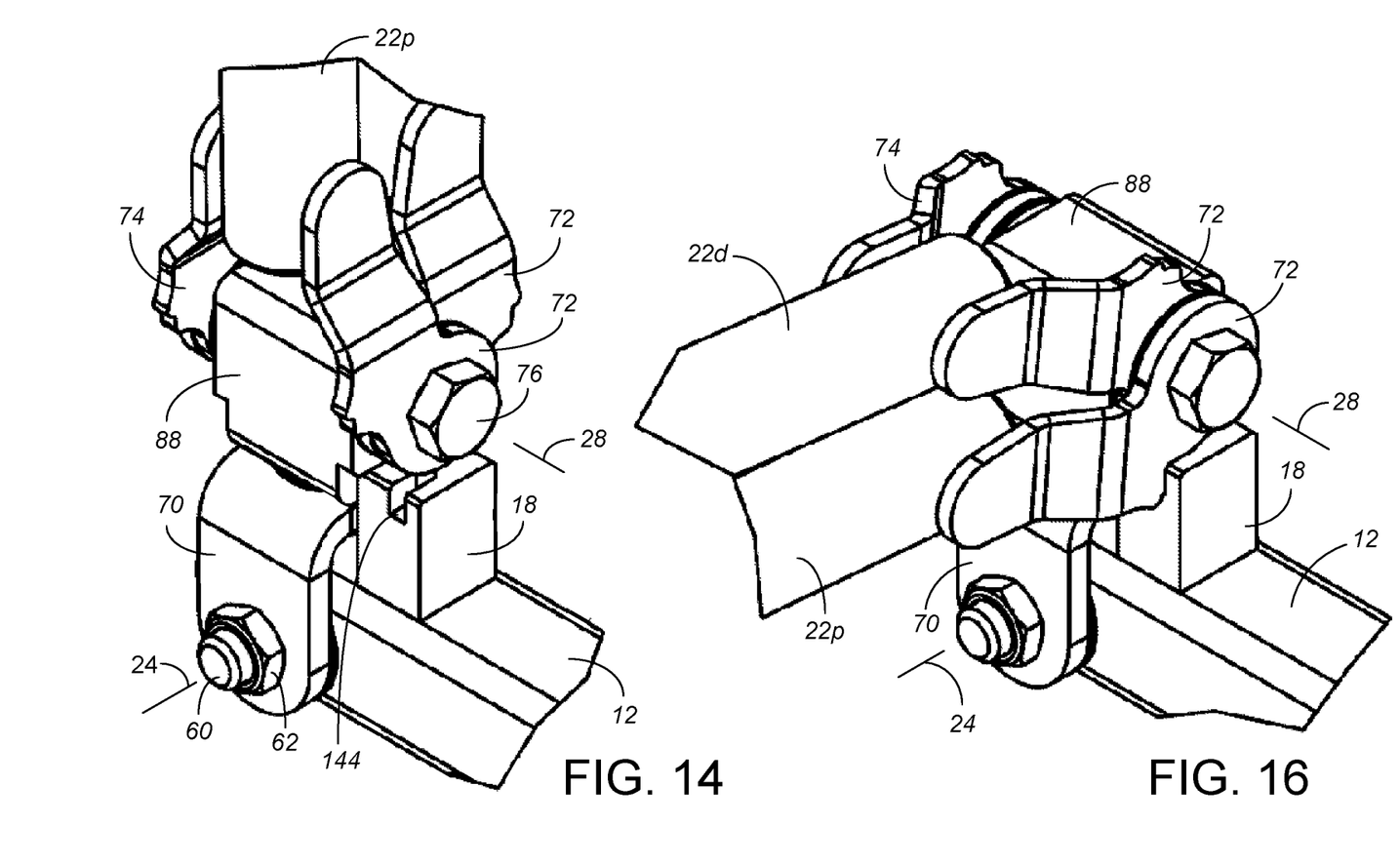
FIG. 14 is a larger view of the pivot joint in the penultimate stowage position, taken from the circle 14 in FIG. 13.
FIG. 16 is a larger view of the pivot joint in the final stowage position, taken from the circle 16 in FIG. 15.
Figure 15:
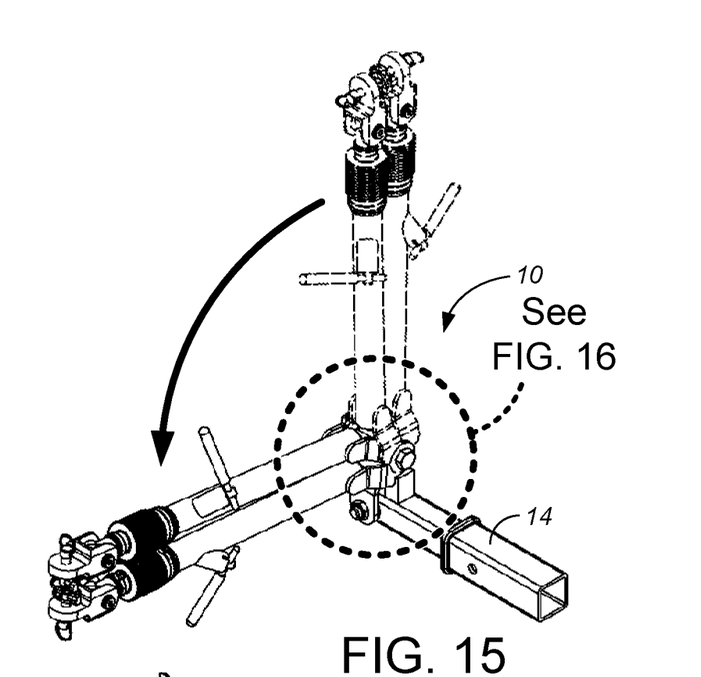
FIG. 15 is a perspective view of the tow bar of FIGS. 1-7, showing the third stowage step into the final stowage position using a first option.
Figures 17, 18:
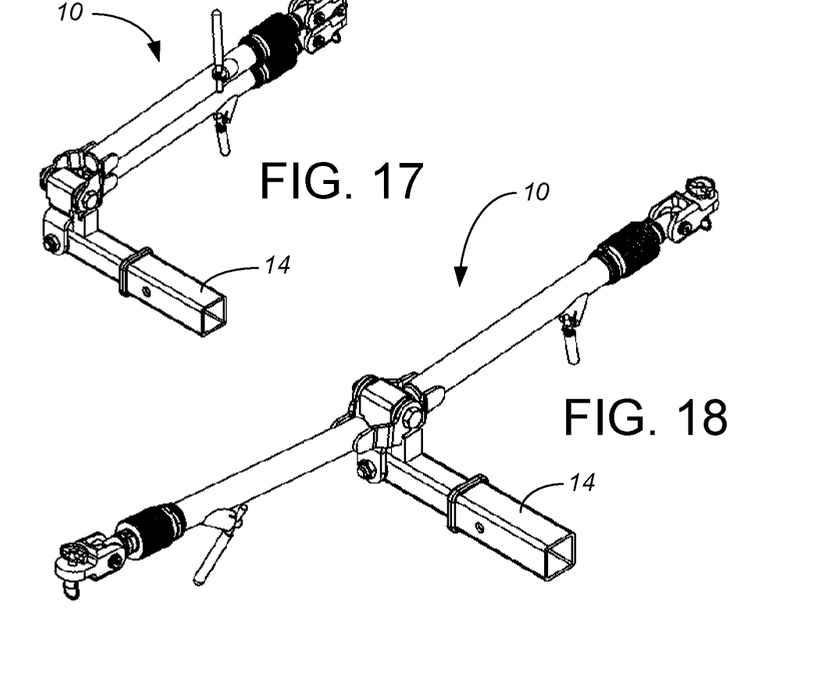
FIG. 17 is a perspective view of the tow bar of FIGS. 1-7, showing the final stowage position using a second option.
FIG. 18 is a perspective view of the tow bar of FIGS. 1-7, showing the final stowage position using a third option.

Unhooking the vehicles from each other and options for stowing of the tow bar 10 on the back of the towing vehicle are explained with reference to FIGS. 13-18. First both vehicles are parked, preferably with their parking brakes on, and the safety cables 52 and any electrical cables are unhooked. One arm 22 at a time, the user removes the lynch pin 116 and pulls the pin 48 out from the towing vehicle tab 56 and lug 40. While pulling upward on the arm's latch handle 38, the user should retract the arm 22 until contact between the retaining ring 120 and the bushing end 108 causes a hard internal stop in the fully retracted position. As shown in FIG. 13, the arms 22d, 22p are pivoted horizontally together and then both arms 22d, 22p are lifted to a vertical position making sure that the pivot block 88 remains square to the stowage block 18. As shown in FIG. 14, the rearward upper edge of the stowage block 18 mates into a squared-off recess 142 of the pivot block 88.

The stowage block 18 includes at least one and more preferably two recesses such as slots, which in the preferred embodiment includes a forward slot 144 open toward the passenger side and a rearward slot 146 open toward the driver side, either of which can be referred to more broadly as a stowage recess or more narrowly as a stowage slot. When the arms 22d, 22p are in the vertical position, the upper plate 72 of the passenger side arm 22p has a tab 148 which lines up longitudinally with the forward slot 144 and the upper plate 72 of the driver side arm 22d has a tab 148 which lines up longitudinally with the rearward slot 146. From the vertical position, the user has three stowage options. In the first option shown in FIGS. 15 and 16, the user lowers both arms 22d, 22p to the passenger side, and the lowering motion causes the tab 148 of the passenger side upper plate 72 to fall within and engage the forward slot 144. The stowage block 18 thereafter holds both arms 22d, 22p horizontally to the passenger side, preventing the arms 22d, 22p from further travel downward (i.e., preventing further pivoting about the third axis 28) and simultaneously preventing motion of either the clevis 70 or the pivot block 88 until the arms 22d, 22p are once again raised into the vertical position. In the second option shown in FIG. 17, the user lowers both arms 22d, 22p to the driver side, and the lowering motion causes the tab 148 of the driver side upper plate to fall within and engage the rearward slot. The stowage block 18 thereafter holds both arms 22d, 22p horizontally to the driver side, preventing the arms 22d, 22p from further travel downward (i.e, preventing further pivoting about the third axis 28) and simultaneously preventing motion of either the clevis 70 or the pivot block 88 until the arms 22d, 22p are once again raised into the vertical position. In the third option shown in FIG. 18, one arm is lowered in each direction, such that the tab 148 of each upper plate 72 engages its respective stowage block slot 144, 146. With any of these three stowage positions, the weight of the arms 22d, 22p will hold the arms 22d, 22p in a horizontal position with the tab 148 in the slot 144 and/or 146 of the stowage block 18 and prevent the arms 22d, 22p from dislodging during vehicle travel.

The present invention thus provides a tow bar assembly 10 which provides elegant stowage options. The extended arm length provides extra hookup radius and clearance, while still allowing compact configurations for product packaging and stowage. The latching mechanism provides active slide resistance for enhanced control when extending the arms 22d, 22p. The latches lock in an automatic and hands free fashion to make towing preparation easy. The bellows 34 seal the extension rods 32 against dirt and grime, ensuring that the smooth extension and retraction lasts over years of towing and weather usage. The anti-friction washers 66, 80, 100 provide a smooth, anti-rattle operation. The three stowage options provide maximum versatility to avoid obstructions. The high-strength steel construction of the most preferred embodiment is rated for towing of up to 7,500 pounds, while having a total weight of less than 40 pounds for easy handling and setup.

Although the present invention has been described with reference to preferred embodiments, workers skilled in the art will recognize that changes may be made in form and detail without departing from the spirit and scope of the invention. In particular, all of the dimensions and materials, unless included in the claims, are exemplary only.

The invention claimed is:

1. A method of stowing a tow bar assembly on a towing vehicle, the tow bar assembly having at least one arm extending generally horizontally from a pivot joint when the tow bar assembly is in use, the arm having a trailing end adapted for attachment to the towed load, the method comprising:
   disconnecting the trailing end of the arm from the towed load;
   raising the arm to a vertically-oriented position extending from the pivot joint upwardly; and
   lowering the arm by pivoting the arm about a longitudinal axis until a portion of the arm extends into a stowage recess, until the portion of the arm engages to help retain the arm in a transversely-directed, generally horizontal stowage position.

2. The method of claim 1, further comprising:
   disengaging a latch which locks the arm in an extended position; and
   retracting the arm to a shorter length, retracted position;
   wherein the arm comprises a main tube and an extension rod in a telescoping arrangement within the main tube, and wherein the latch comprises a retention shaft with a handle for rotation of the retention shaft, the retention shaft having a first rotational position in which the retention shaft prevents the extension rod from telescoping and a second rotational position in which the retention shaft allows the extension rod to telescope, the disengaging act comprising:
   rotating the handle to move the retention shaft from the first rotational position to the second rotational position, wherein the retention shaft rotates about a retention shaft axis of rotation which is at a non-perpendicular angle to and intersects a longitudinal axis of the extension rod.

3. The method of claim 2, wherein the handle is gravitationally biased toward the first rotational position and spring biased toward the first rotational position, and wherein the act of rotating the handle comprises overcoming a force of gravity on the handle and overcoming a spring force on the handle.

4. The method of claim 2, wherein the first rotational position places an end of the retention shaft within a recessed portion of the extension rod, and wherein the act of rotating the handle rotates the retention shaft about the retention shaft axis of rotation.

5. The method of claim 4, in which the end of the retention shaft includes a flat, and wherein the act of positioning the handle in the second rotational position moves the retention shaft to the second rotational position, thereby orienting the flat toward the extension rod and removing the end of the retention shaft from the recessed portion of the extension rod.

6. The method of claim 1, wherein the tow bar assembly comprises a shank attached to a receiver on the towing vehicle, wherein the shank comprises a stowage block secured on a top surface of the shank, with the stowage recess being a slot defined in the stowage block, wherein the act of lowering the arm by pivoting the arm about the longitudinal axis lowers the portion of the arm until the portion of the arm extends into the slot and engages the stowage block to help retain the arm in the transversely-directed, generally horizontal stowage position.

7. The method of claim 1, wherein the tow bar assembly comprises a shank attached to a receiver on the towing vehicle, wherein the at least one stowage recess comprises a first stowage slot and a second stowage slot longitudinally spaced from the first stowage slot, wherein the act of lowering the arm by pivoting the arm about the longitudinal axis in a counterclockwise direction when viewed from behind the towing vehicle lowers a first portion of the arm until the first portion of the arm extends into the first stowage slot to help retain the arm in a transversely-directed, generally horizontal stowage position to a driver side of the shank, and wherein the act of lowering the arm by pivoting the arm about the longitudinal axis in a clockwise direction when viewed from behind the towing vehicle lowers a second portion of the arm until the second portion of the arm extends into the second stowage slot to help retain the arm in a transversely-directed, generally horizontal stowage position to a passenger side of the shank.

8. The method of claim 7, wherein the at least one arm comprises a driver side arm and a passenger side arm, with the first portion being on the driver side arm, and with the second portion being on the passenger side arm.

9. The method of claim 8, wherein the tow bar assembly allows the selection of any of three stowage options which can be selected while performing the act of lowering the arm by pivoting the arm about the longitudinal axis: a first stowage option having the driver side arm and the passenger side arm both directed from the pivot joint toward the driver side of the towing vehicle, a second stowage option having the driver side arm and the passenger side arm both directed from the pivot joint toward the passenger side of the towing vehicle, and a third stowage option having the driver side arm directed from the pivot joint toward the driver side of the towing vehicle and the passenger side arm directed from the pivot joint toward the passenger side of the towing vehicle.

10. The method of claim 1, wherein the at least one arm is extendable to a longer length, extended position and retractable to a shorter length, retracted position, and further comprising:
  retracting the arm to the shorter length, retracted position prior to stowing the arm in the transversely-directed, generally horizontal stowage position.

11. The method of claim 10, wherein the arm comprises a latch for locking the arm in the extended position, and further comprising:
  unlocking the latch prior to retracting the arm to the shorter length, retracted position.

12. The method of claim 11, wherein the arm comprises a main tube and an extension rod in a telescoping arrangement within the main tube, and wherein the latch automatically engages to lock the arm in the extended position when the extension rod is pulled to the extended position, and further comprising:
  after stowing the arm, pulling the extension rod to the extended position.

13. The method of claim 11, wherein the arm comprises a main tube and an extension rod in a telescoping arrangement within the main tube, and wherein the latch comprises a retention shaft with a handle for rotation of the retention shaft, the retention shaft having a first rotational position in which the retention shaft prevents the extension rod from telescoping and a second rotational position in which the retention shaft allows the extension rod to telescope, and further comprising:
  positioning the handle in the second rotational position prior to retracting the arm to the shorter length, retracted position.

14. The method of claim 13, wherein the handle is gravitationally biased toward the first rotational position, and wherein the act of positioning the handle in the second rotational position comprises overcoming a force of gravity on the handle.

15. The method of claim 13, wherein the handle is spring biased toward the first rotational position, and wherein the act of positioning the handle in the second rotational position comprises overcoming a spring force on the handle.

16. The method of claim 13, wherein the retention shaft rotates about a retention shaft axis of rotation which is at a non-perpendicular angle to and intersects a longitudinal axis of the extension rod, and wherein the first rotational position places an end of the retention shaft within a recessed portion of the extension rod, and wherein the act of positioning the handle in the second rotational position rotates the retention shaft about the retention shaft axis of rotation.

17. The method of claim 16, in which the end of the retention shaft includes a flat, and wherein the act of positioning the handle in the second rotational position moves the retention shaft to the second rotational position, thereby orienting the flat toward the extension rod and removing the end of the retention shaft from the recessed portion of the extension rod.

18. A method of stowing a tow bar assembly on a towing vehicle, the tow bar assembly having at least one arm extending generally horizontally from a pivot joint when the tow bar assembly is in use, the arm having a trailing end adapted for attachment to the towed load, the method comprising:
  disconnecting the trailing end of the arm from the towed load;
  disengaging a latch which locks the arm in an extended position; and
  retracting the arm to a shorter length, retracted position;
  wherein the arm comprises a main tube and an extension rod in a telescoping arrangement within the main tube, and wherein the latch comprises a retention shaft with a handle for rotation of the retention shaft, the retention shaft having a first rotational position in which the retention shaft prevents the extension rod from telescoping and a second rotational position in which the retention shaft allows to extension rod to telescope, the disengaging act comprising:
  rotating the handle to move the retention shaft from the first rotational position to the second rotational position, wherein the handle is gravitationally biased toward the first rotational position, and wherein the act of rotating the handle comprises overcoming a force of gravity on the handle.

19. The method of claim 18, wherein the retention shaft rotates about a retention shaft axis of rotation which is at a non-perpendicular angle to and intersects a longitudinal axis of the extension rod, and wherein the first rotational position places an end of the retention shaft within a recessed portion of the extension rod, and wherein the act of rotating the handle rotates the retention shaft about the retention shaft axis of rotation.

20. A method of stowing a tow bar assembly on a towing vehicle, the tow bar assembly having at least one arm extending generally horizontally from a pivot joint when the tow bar assembly is in use, the arm having a trailing end adapted for attachment to the towed load, the method comprising:

disconnecting the trailing end of the arm from the towed load;

raising the arm by pivoting the arm about a transverse pitch pivot axis of the pivot joint to a vertically-oriented position extending from the pivot joint upwardly; and lowering the arm by pivoting the arm about a longitudinal axis until a tab of the arm extends into a slot exposed on a top of a stowage block, the stowage block being fixed on a shank of the tow bar assembly at a location forward of the transverse pitch pivot axis, until the tab engages against the stowage block to help retain the arm in a transversely-directed, generally horizontal stowage position.

* * * * *